US008864561B2

(12) United States Patent
Weichholdt et al.

(10) Patent No.: US 8,864,561 B2
(45) Date of Patent: Oct. 21, 2014

(54) HARVESTED CROP RESIDUE CHOPPER AND DISTRIBUTION ARRANGEMENT FOR A COMBINE WITH AN IMPELLER BLOWER WHOSE SHAPE CONFORMS TO THE CONTOUR OF THE STRAW CHOPPER

(75) Inventors: Dirk Weichholdt, Woelfling les Sarreguemines (FR); Rico Priesnitz, Blies-Ebersing (FR); Friedrich K Lauer, Krähenberg (DE); Oliver Klein, Saarlouis (DE); Chad Allen Dow, East Moline, IL (US); Joel David Ferris, Davenport, IA (US)

(73) Assignee: Deere & Company, Moline, IL (US)

( * ) Notice: Subject to any disclaimer, the term of this patent is extended or adjusted under 35 U.S.C. 154(b) by 990 days.

(21) Appl. No.: 12/547,619

(22) Filed: Aug. 26, 2009

(65) Prior Publication Data

US 2011/0053669 A1   Mar. 3, 2011

(51) Int. Cl.
*A01F 12/40*  (2006.01)
*A01D 41/12*  (2006.01)

(52) U.S. Cl.
CPC .................................. *A01D 41/1243* (2013.01)
USPC ........................................................ 460/112

(58) Field of Classification Search
USPC ............ 56/3, 73, 74, 99, 100, 111–113, 121;
460/3, 73, 74, 99, 100, 111–113, 121,
460/901
See application file for complete search history.

(56) References Cited

U.S. PATENT DOCUMENTS

| | | | | |
|---|---|---|---|---|
| 2,050,631 A * | 8/1936 | Schlayer | ......................... | 460/69 |
| 3,874,604 A * | 4/1975 | Gronberg et al. | ............. | 241/243 |
| 4,362,272 A * | 12/1982 | Martin | ............... | 239/7 |
| 4,646,757 A * | 3/1987 | Schmitt et al. | ............... | 460/112 |
| 4,711,074 A * | 12/1987 | Jetzinger | ...................... | 56/13.6 |
| 5,269,126 A * | 12/1993 | Kalverkamp | ..................... | 56/60 |
| 5,775,991 A * | 7/1998 | Underwood et al. | ......... | 460/111 |
| 6,416,405 B1 * | 7/2002 | Niermann | ....................... | 460/79 |
| 6,663,485 B2 * | 12/2003 | Niermann | ....................... | 460/79 |
| 6,685,558 B2 * | 2/2004 | Niermann et al. | ............ | 460/111 |
| 6,736,721 B2 * | 5/2004 | Niermann et al. | ............ | 460/112 |
| 7,086,942 B2 * | 8/2006 | Niermann et al. | ............ | 460/111 |
| 7,306,174 B2 * | 12/2007 | Pearson et al. | ................ | 239/663 |
| 7,467,997 B2 * | 12/2008 | Niermann et al. | ............ | 460/111 |
| 2003/0109293 A1 * | 6/2003 | Wolters | ........................ | 460/111 |
| 2003/0109294 A1 * | 6/2003 | Wolters et al. | ............... | 460/112 |
| 2005/0059445 A1 * | 3/2005 | Niermann et al. | ............ | 460/112 |
| 2006/0189362 A1 * | 8/2006 | Niermann et al. | ............ | 460/111 |
| 2007/0026912 A1 * | 2/2007 | Anderson et al. | ............ | 460/112 |
| 2008/0268927 A1 * | 10/2008 | Farley et al. | ................... | 460/111 |
| 2009/0111548 A1 * | 4/2009 | Landuyt | ..................... | 460/112 |
| 2009/0325659 A1 * | 12/2009 | Overschelde et al. | ......... | 460/112 |

* cited by examiner

*Primary Examiner* — Thomas B Will
*Assistant Examiner* — Joan D Misa

(57) ABSTRACT

The invention concerns a harvested crop residue chopper and distribution arrangement for a combine (10) with a straw chopper (60) with a rotor (74) that can be brought into rotation about a horizontal axis (98) with chopper blades (76) fastened thereto that define an outer envelope (96), and with at least one impeller blower (82) arranged downstream of the straw chopper (60) with impeller blades (84) that can rotate about an axis of rotation (88) that extends vertically, in which the impeller blades (84) are provided with outer edges (94) that conform to the envelope (96) of the chopper knives (76) and follow it very closely and are not in contact with it.

11 Claims, 3 Drawing Sheets

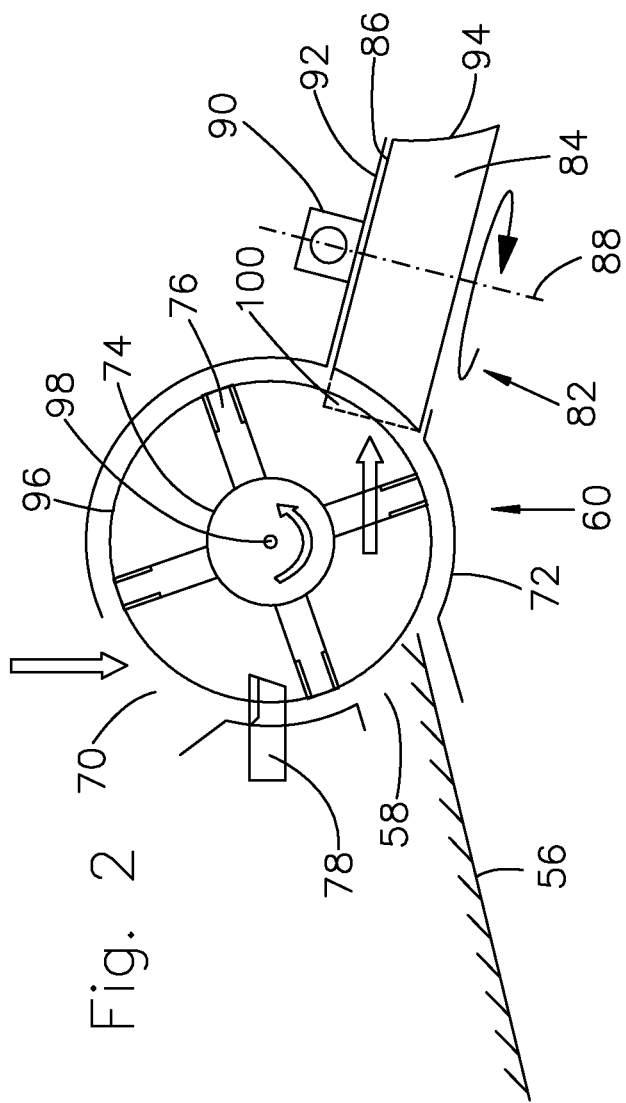

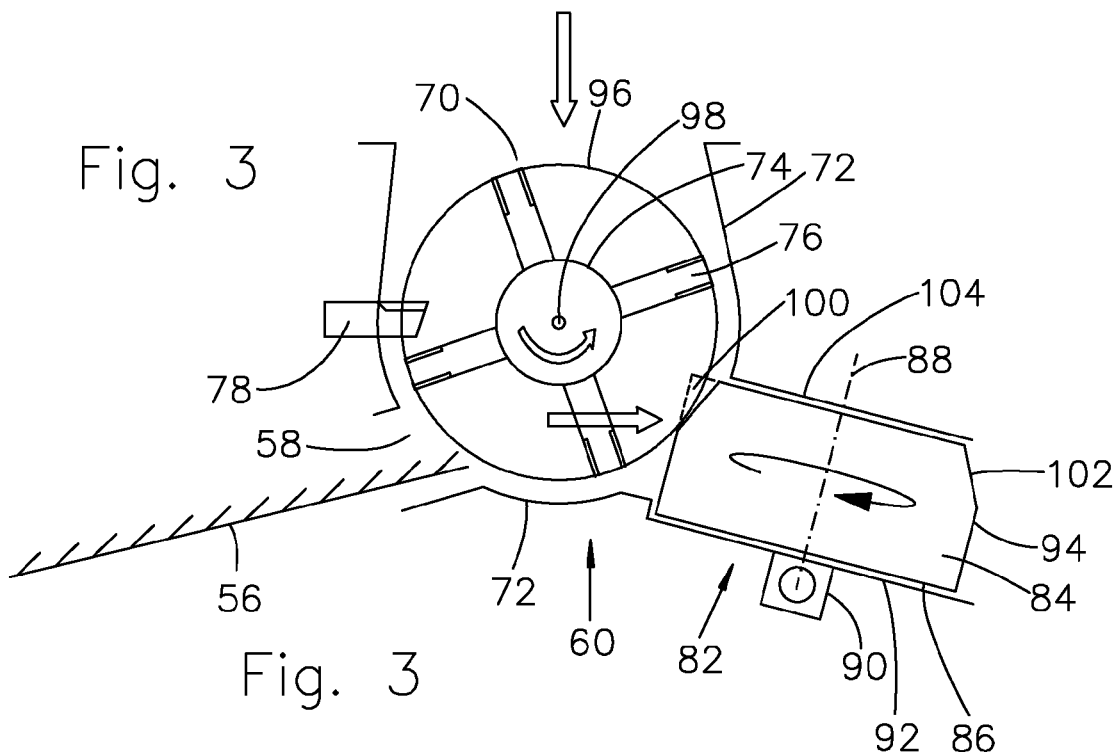
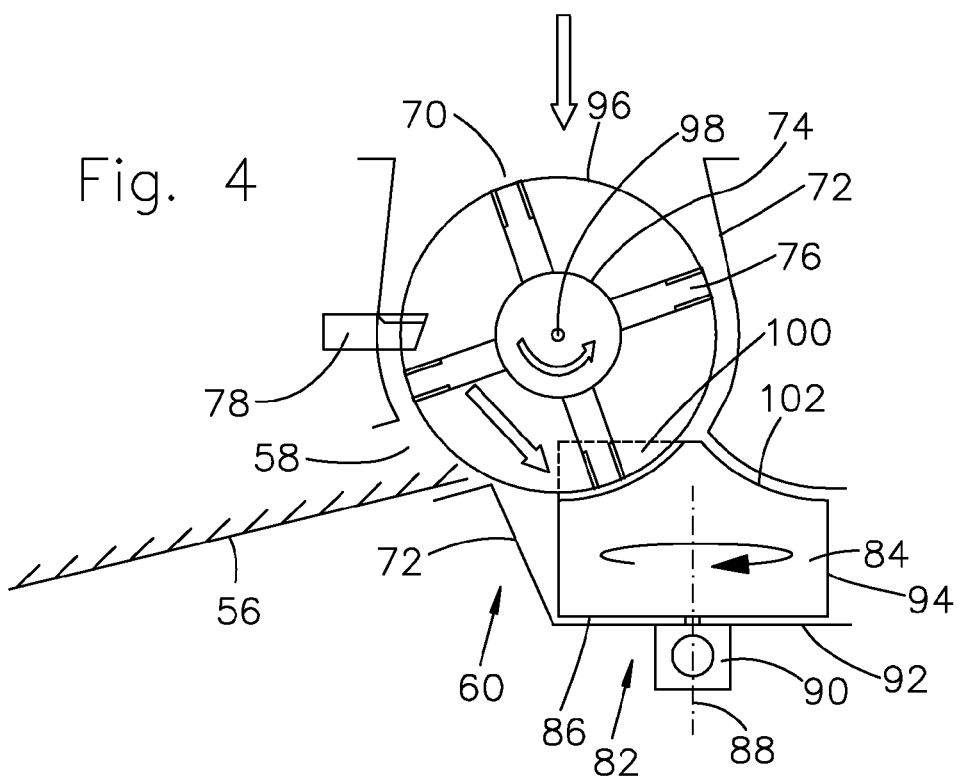

HARVESTED CROP RESIDUE CHOPPER AND DISTRIBUTION ARRANGEMENT FOR A COMBINE WITH AN IMPELLER BLOWER WHOSE SHAPE CONFORMS TO THE CONTOUR OF THE STRAW CHOPPER

FIELD OF THE INVENTION

The invention relates generally to agricultural combines. More particularly it relates to crop processing elements for agricultural combine. Even more particularly it relates to a harvested crop residue chopper and distribution arrangement with a straw chopper with a rotor that can be brought into rotation about a horizontal axis and with chopper knives fastened to it that define an outer envelope, and at least one impeller blower arranged downstream of the straw chopper with impeller blades that can rotate about an axis of rotation extending vertically.

BACKGROUND OF THE INVENTION

Agricultural combines are large machines that harvest, thresh, separate, and clean agricultural planted harvested crops such as corn. The cleaned corn, so obtained, is stored in a corn tank on the combine. As a rule, the threshed out straw is either chopped and distributed on the fields across the width of the cutter head or conducted around the straw chopper and deposited in a swath on the field without being chopped, in order to be able pick it up subsequently with a baler. The harvested crop residue remaining at the rear outlet of the cleaning arrangement, such as chaff and small straw particles, is distributed across the field by a chaff spreader or is conducted through the straw chopper and distributed across the field.

DE 199 08 111 C describes a combine with a straw chopper and two impeller blowers, arranged side by side alongside each other, that follow the straw chopper for the widely distributed ejection of straw across the field. The outlet of the straw chopper and the inlet of the impeller blowers are arranged in a housing, that includes impeller blades rotating about an approximately vertical axis and are arranged in a single plane for the purpose of transfer of the harvested crop without changing direction. The impeller blades are fastened below the cover plate to a central, circular cylindrical shaft that is brought into rotation by means of a drive element arranged above the cover plate. The impeller blades are configured as rectangles so that their outer edges are oriented parallel to the axis of rotation and define a circular cylindrical envelope when rotated.

US 2007/0015556 A describes an impeller blower in which the straw in chopped form is thrown against the impeller blowers by means of a straw chopper at an angle from below, the impeller blowers are built up of impeller blades on an upper circular disk and extend downward radially and vertically to the surface of the disk. The impeller blades are wedge shaped, where the outer ends of the impeller blades extend to a greater distance vertically than the inner ends. The outer edges of the impeller blades (except for rather short, upper corner regions that inclined inwards) are oriented parallel to the axis of rotation, so that they define a circular, cylindrical envelope when rotated.

In the case of the known arrangement of straw choppers and following impeller blades, it is seen as detrimental on the basis of the outer edges of the impeller blades that are parallel to the axis of rotation that a certain distance must be maintained in order to avoid a collision between the straw chopper and the following impeller blade. However, problems may result in view of the distance that must be maintained in the transfer of harvested crop.

SUMMARY OF THE INVENTION

The problem underlying the invention is seen in the need for preparing a harvested crop residue chopper- and distribution arrangement of the kind cited initially for a combine that makes possible an improved flow of the harvested crop residue.

This problem is solved according to the invention by the teaching of claim 1 herein, where the further claims cite characteristics that further develop the solution to great advantage.

A harvested crop residue chopper and distribution arrangement for a combine includes a straw chopper with a rotor rotating about the horizontal axis of rotation with chopper knives attached to it that chop and eject the chopped straw and/or the chaff conducted to it. An impeller blower (or two or more impeller blowers arranged to the side alongside each other) is arranged downstream of the straw chopper that includes impeller blades that can be brought into rotation about an axis of rotation by an appropriate drive. The axis of rotation of the impeller blades extends vertically that means that it is sufficient when the axis of rotation includes a vertical component so that it need not extend exactly vertically but may be inclined slightly to the front or to the rear or to the side. The outer edges of the impeller blades are provided with at least partial regions that do not extend parallel to the axis of rotation of the impeller blower, but extend in a straight line or in a complementary curve that conforms to the envelope of the chopper knives and define partly or completely non cylindrical but conical enveloping surface of the impeller blower. Therefore the outer edges of the impeller blades conform to the envelope of the chopper knives with a relatively narrow gap, so that the spacing between the straw chopper and the impeller blower can be reduced as compared to the state of the art, and the transfer of the crop from the straw chopper to the impeller blades can be improved.

In a preferred embodiment of the invention the straw chopper and the impeller blades are located within a common housing that permits a saving of material and a compact configuration. This characteristic represents an independent invention that deserves an independent rank.

BRIEF DESCRIPTION OF THE DRAWINGS

Three embodiments of the invention are explained on the basis of the figures.

FIG. 2 shows an enlarged side view of the straw chopper and the impeller blower of FIG. 1.

FIG. 3 shows a side view of a second embodiment of a straw chopper and an impeller blower.

FIG. 4 shows a side view of a third embodiment of a straw chopper and an impeller blower.

DETAILED DESCRIPTION OF THE PREFERRED EMBODIMENTS

Figure 1:
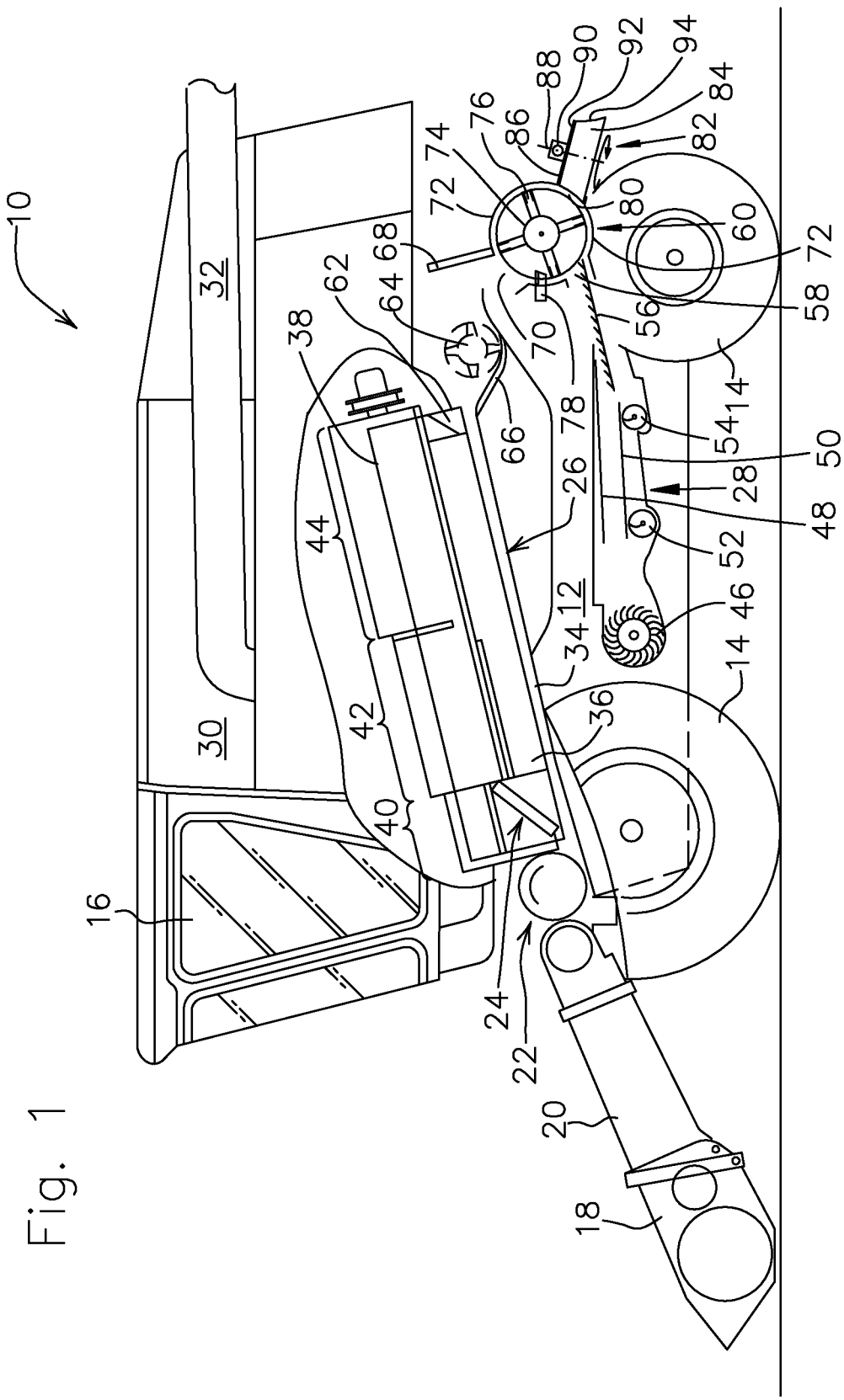
FIG. 1 shows a partial section in side view of a combine with a straw chopper and a first embodiment of an impeller blower.

FIG. 1 shows an agricultural combine 10 with a chassis 12 with wheels 14 in contact with the ground that are fastened to the chassis 12 and are used for the propulsion of the combine 10 in the forward operating direction that extends to the left in FIG. 1. The operation of the combine 10 is controlled from the operator's cab 16. A cutter head 18 is used in order to harvest crop containing corn and to conduct it to a slope conveyor 20. The harvested crop is conducted to the guide drum 22 by a slope conveyor 20 disposed within the feederhouse. The guide drum 22 guides the harvested crop through an inlet transition section 24 to an axial harvested crop processing arrangement 26. In the following, directions such as "front", "forward", and "forwardly" refer to the forward operation direction of the combine 10 that extends to the left in FIG. 1. Directions such as "rear", "rearward", and "rearwardly" referred to a direction opposite to the forward operation direction of the combine 10.

The harvested crop processing arrangement 26 includes a rotor housing 34 with a rotor 36 arranged within it. The rotor 36 includes a hollow drum 38 to which crop processing elements are fastened for a charging section 40, a threshing section 42, and a separating section 44. The charging section 40 is arranged on the front side of the harvested crop processing arrangement 26. The threshing section 42 and the separating section 44 are located in the longitudinal direction downstream and to the rear of the charging section 40. In the charging section 40 the drum 38 is in the form of a truncated cone. The threshing section 42 includes a forward section in the form of a truncated cone and a cylindrical rear section. The cylindrical separating section 44 of the drum 38 is located at the end of the axial harvested crop processing arrangement 26. In place of an axial harvested crop processing arrangement 26 a tangential threshing drum followed by an axial separating section or a straw chopper could be used.

Corn and chaff that fall through a thresher basket associated with the threshing section 42 and a separating grate associated with the separating section 44 are conducted to a cleaning system 28 with a blower 46, and sieves 48, 50 with louvers, that can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30. The clean corn in the corn tank 30 can be unloaded by an unloading screw conveyor 32 to a corn wagon, trailer, or truck. Harvested crop remaining at the lower end of the lower sieve 50 is again conducted to the harvested crop processing arrangement 26 by means of a screw conveyor 54 and an overhead conveyor (not shown). The harvested crop residue delivered at the rear end of the upper sieve consists generally of chaff and small straw particles, and it is conveyed by an oscillating sheet conveyor 56 rearwardly and into a lower inlet 58 of a straw chopper 60.

Threshed out straw that leaves the separating section 44 is ejected through an outlet 62 from the harvested crop processing arrangement 26 and conducted to an ejection drum 64. The ejection drum 64 interacts with the sheet 66 located underneath it and ejects the straw to the rear. There is a wall 68 located to the rear of the ejection drum 64 that guides the straw into an upper inlet 70 of the straw chopper 60.

The straw chopper 60 is composed of a housing 72 and a rotor 74 arranged within it that can rotate about an axis extending horizontally and transversely to the direction of operation together with chopper knives 76, pendulously suspended in pairs and distributed about the circumference of the rotor 74, that interact with opposing knives 78, fixed to the housing. Downstream of an outlet 80 of the straw chopper 60, two impeller blowers 82 are provided that are arranged side-by-side alongside each other (of which only one can be seen in FIG. 1). The impeller blowers 82 include a number of impeller blades 84, each of which is connected rigidly to an upper circular disk 86, that can rotate about a central axis of rotation 88 that extends generally vertically, but with a slight rearward inclination. The disks 86 with the impeller blades 84 that extend radially can be brought into rotation by a hydraulic motor 90 that is fastened above a bottom sheet 92 that is connected to the housing 72 of the straw chopper 60.

It should be noted that an adjustable flap could be arranged between the ejection drum 64 and the upper inlet 70 of the straw chopper 60, with which the straw could be selectively guided past the rear of the straw chopper 60 and deposited on the field in a swath in a long straw operating mode.

As can be seen in FIG. 2, the outer edges 94 of the impeller blades 84 are provided with a radius over their entire height that is complementary to the envelope 96 defined by the rotating chopper knives 76, so that the distance between the envelope 96 of the chopper knives 76 and the edge 94 of the impeller blades 84 is constant over the entire height of the impeller blades 84 so that the impeller blades 84 conform to the envelope 96 of the chopper knives 76. The diameter of the impeller blades 84 as measured in the radial direction is larger at its lower end that at its upper end. If the impeller blades 84 had maintained the diameter of the lower end over their entire height then they would have collided with the chopper knives 76 at their upper ends as indicated by the dashed lines. In other words, a recessed area 100 is created by the conical form of the impeller blades 84, that otherwise would intrude into the envelope 96 of the chopper knives 76. Due to the reduced spacing between the straw chopper 60 and the impeller blower 82 the transfer of the harvested crop is improved, so that any blockage of the harvested crop residue can be avoided even while providing greater throughput.

In the second embodiment, shown in FIG. 3, components identical to those of the first embodiment are identified with the same part number call outs. Essential differences between FIG. 2 and FIG. 3 that should be noted are that the disk 86, the bottom sheet 92, and the hydraulic motor 90 are arranged underneath the impeller blower 82 in the second embodiment. Furthermore, in the embodiment according to FIG. 3, the outer edges 94 of the impeller blades 84 are slanted in a straight line inward complementary to the envelope 96 in the upper partial region 102, in order to create a recessed area 100, without which the impeller blades 84 would collide with the chopper knives 76 as indicated by the dashed lines. The spacing between the envelope 96 of the chopper knives 76 and the edge 94 is nearly constant over the length of the partial region 102. The outer edges 94 of the partial region 102 extend parallel to the axis of rotation 88 that is also oriented at an angle to the rear and upward. The housing 72 of the straw chopper 60 and the housing of the impeller blower 82 formed by the bottom sheet 92 and an upper sheet metal housing 104 are one-piece components.

In the third embodiment, shown in FIG. 4, corresponding elements of the second embodiment are identified by the same part number call-outs. The essential difference is seen in the fact that the straw chopper 60 delivers the harvested crop residue processed by it not at an angle to the rear and downward, as in the case of the first and second embodiment, but approximately vertically and downward into the impeller blower 82. Accordingly, the axis of rotation 88 of the impeller blower 82 is located underneath the envelope 96 of the chopper knives 76 of the straw chopper 60. Furthermore, in the embodiment according to FIG. 4, the outer edges 94 of the impeller blades 84 are provided with a radius conforming to the envelope 96 of the chopper knives 76 only in their upper partial region 102 and complementary to the envelope 96 in order to create a recessed area 100, without which the impeller blades 84 would otherwise collide with the chopper knives 76 as indicated by the dashed lines. The spacing between the envelope 96 of the chopper knives 76 and the edge 94 is nearly constant over the length of the partial region 102. Underneath the curved partial region 102 the outer edges 94 extend parallel to the axis of rotation 88 which extends exactly vertically. The housing 72 of the straw chopper 60 and the housing of the impeller blower 82 formed by the sheet metal bottom 92 and an upper sheet metal housing 104 are also configured as one piece components.

The invention claimed is:

1. A harvested crop residue chopper and distribution arrangement for a combine (10) comprising:
    a straw chopper (60) with a rotor (74) that can be brought into rotation about a horizontal axis (98) and chopper knives (76) fastened thereto which define an outer envelope (96),
    and at least one impeller blower (82) arranged downstream of the straw chopper (60) with impeller blades (84) that rotate about an axis of rotation (88) that extends vertically, characterized by the impeller blades (84) that are provided with outer edges (94) that are at an angle with respect to the axis of rotation (88) in a direction to conform very closely to the envelope (96) of the chopper knives (76) and are not in contact with the envelope (96).

2. A harvested crop residue chopper and distribution arrangement according to claim 1, characterized by the outer edges (94) of the impeller blades (84) extending over their entire height or a partial region (102) thereof in a form conforming to the envelope (96) of the chopper knives (76) in the shape of a curve or a straight line and not parallel to the axis of rotation (88) of the impeller blower (82).

3. A harvested crop residue chopper and distribution arrangement according to claim 2, characterized by the impeller blades (84) tapering to a smaller width in an upward direction.

4. A harvested crop residue chopper and distribution arrangement according to claim 2, characterized by the straw chopper (60) and the impeller blower (82) being arranged within a common housing (72, 92, 104).

5. A harvested crop residue chopper and distribution arrangement according to claim 1, characterized by the impeller blades (84) tapering to a smaller width in an upward direction.

6. A harvested crop residue chopper and distribution arrangement according to claim 5, characterized by the straw chopper (60) and the impeller blower (82) being arranged within a common housing (72, 92, 104).

7. A harvested crop residue chopper and distribution arrangement according to claim 1, characterized by the straw chopper (60) and the impeller blower (82) being arranged within a common housing (72, 92, 104).

8. A combine (10) with a harvested crop residue chopper and distribution arrangement according to claim 1.

9. A combine (10) with a harvested crop residue chopper and distribution arrangement according to claim 2.

10. A combine (10) with a harvested crop residue chopper and distribution arrangement according to claim 5.

11. A combine (10) with a harvested crop residue chopper and distribution arrangement according to claim 7.

* * * * *